April 21, 1925.

H. FLESSNER 1,534,843

STOCK WATERING DEVICE

Filed Oct. 6, 1924

Inventor:
Hinrich Flessner

By

Attorneys

April 21, 1925.
H. FLESSNER
1,534,843
STOCK WATERING DEVICE
Filed Oct. 6, 1924  2 Sheets-Sheet 2
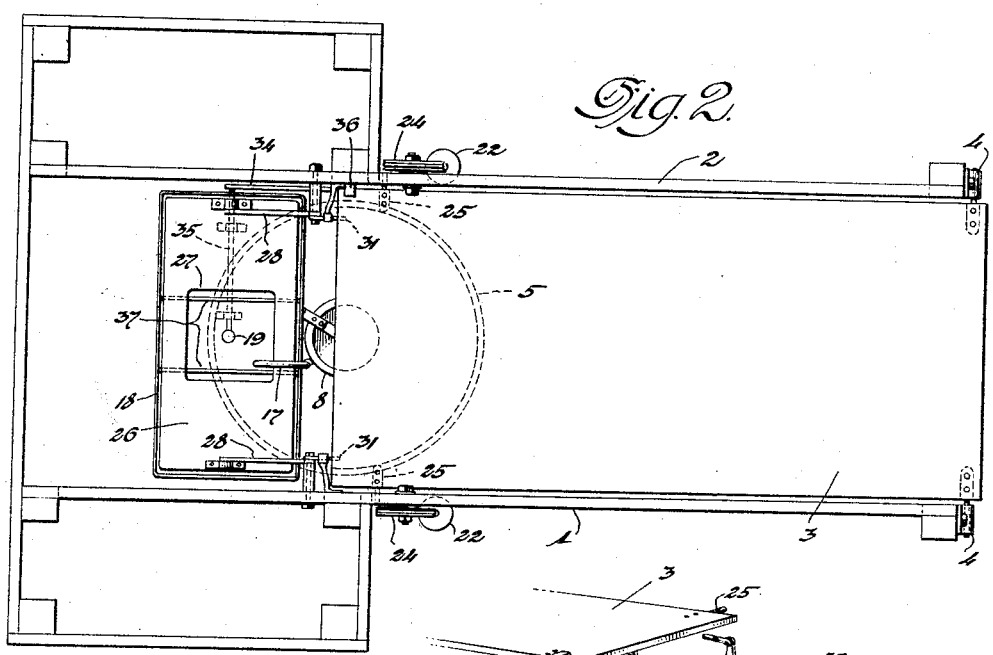
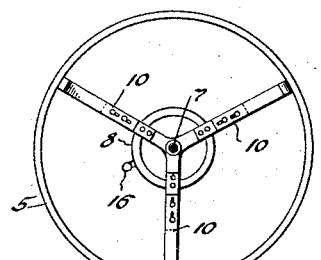
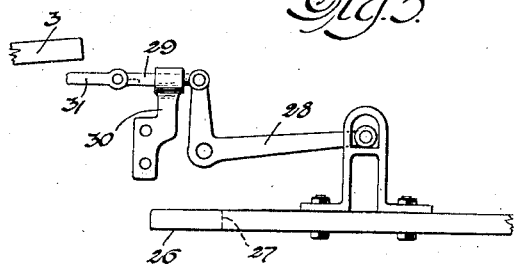
Inventor:
Hinrich Flessner Patented Apr. 21, 1925.

1,534,843

UNITED STATES PATENT OFFICE.

HINRICH FLESSNER, OF HIGHLAND PARK, MICHIGAN.

STOCK-WATERING DEVICE.

Application filed October 6, 1924. Serial No. 741,840.

*To all whom it may concern:*

Be it known that I, HINRICH FLESSNER, a citizen of Germany, residing at Highland Park, in the county of Wayne and State of Michigan, have invented certain new and useful Improvements in Stock-Watering Devices, of which the following is a specification, reference being had therein to the accompanying drawings.

This invention has reference to devices used in connection with wells for the purpose of watering stock, wherein means such as a platform or runway operable by the weight of an animal walking thereon is caused to effect the pumping of water from a well into a suitable receptacle.

Such devices as have been hitherto employed for this purpose have not generally taken into consideration the different conditions to be contended with in summer and winter, and it is an object of this invention to provide a stock watering device which is particularly adaptable to variation in its adjustment or operation to meet diverse conditions as to temperature such as are met with in extreme hot and cold seasons.

It is also an object of the said invention to provide in a device of this type a float adapted to be removed or rendered inoperable with respect to certain parts of the apparatus which it is normally intended to control, whereby the actuation of the device may be varied to suit the season, and wherein in one case a more or less constant supply of water to a watering trough or tank may be maintained and in the other case an intermittent supply provided only on such occasions as the device may be operated by an animal seeking such water, the said tank being drained to prevent freezing or excessive lowering of the temperature of the water in the tank between such intermittent supply.

The invention further aims to provide a novel system of water supply for a cattle watering device which may be readily installed above and in a well to accomplish the results sought to be obtained and herein set forth, and which will be simple and efficient in operation irrespective of the season in which it is used; a still further object being to provide for the prevention of pollution of the well water when water from the trough or tank is returned thereto, particularly when the intermittent supply referred to is being effected; and still further objects subsidiary to or resulting from the aforesaid objects, or from the construction or operation of the invention as it may be carried into effect, will become apparent as the said invention is hereinafter further disclosed.

In carrying said invention into effect, I may provide for application to or in combination with a well, a suitable pump provided with means for securing it in position in a well, the said pump having a suitably valved discharge pipe and being provided with operating means associated with a movable platform or runway forming an approach to the well together with a trough or tank into which the discharge pipe opens, this trough being provided with a float adapted when in raised position to lock the platform against operation and to be removed to permit the free operation of the said platform in winter time, so that a fresh supply of water may be discharged into said tank each time an animal steps upon the movable platform; means being also provided and adapted to be actuated by the said platform to open an outlet valve from said tank and to said well upon the removal of weight from the said platform, when the device is adapted by the removal of the float for intermittent water supply, a filter being also provided through which the water from the tank is returned to the well upon the operation of the outlet valve referred to.

All of which is more particularly described and ascertained hereinafter, by way of example, having reference to the accompanying drawings, wherein Figure 1 is a sectional elevation of a device embodying the said invention installed in a well;

Figure 2 is a plan of the same;

Figure 3 is a fragmentary detail perspective view illustrating the main parts of the device, some of which are broken away to more clearly show the construction;

Figure 4 is a fragmentary detail view partly broken away of the float, illustrating the mechanism controlling the operation of the platform;

Figure 5 is a plan of the pump situated in the well;

Similar characters of reference indicate similar parts in the several figures of the drawings.

Figure 1:
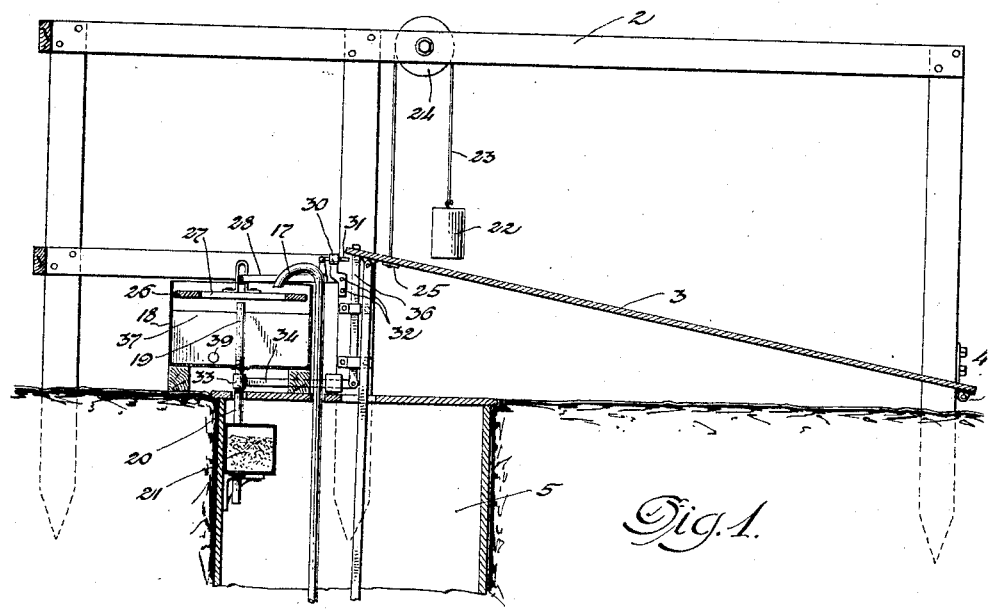
Figures 6, 7:
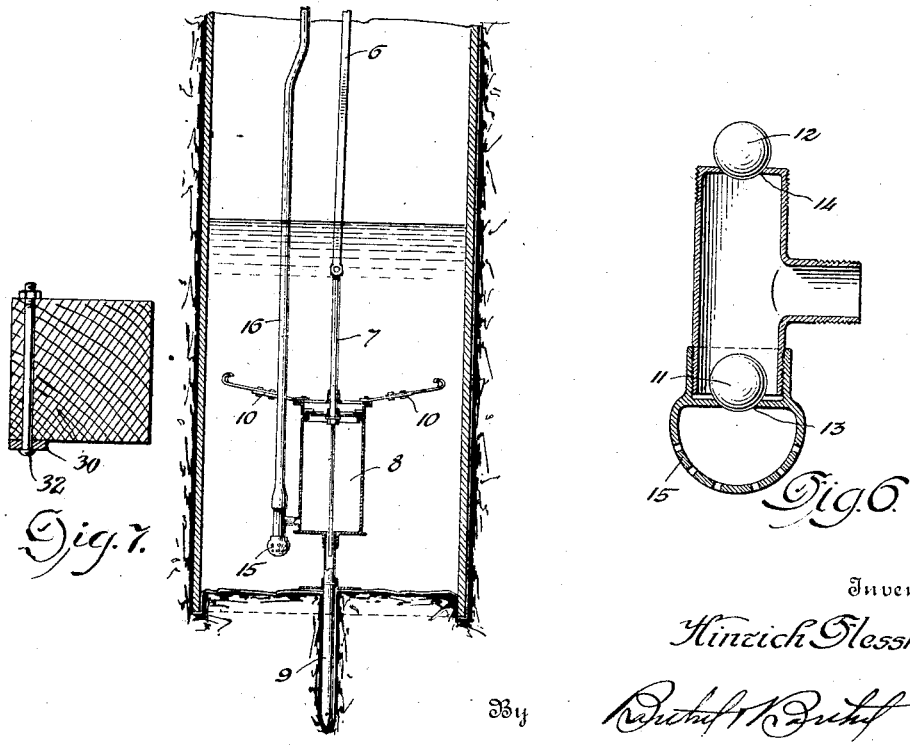
Figure 6 is a vertical section of the double check valve controlling the admission of water to the pump and to the discharge pipe.
Figure 7 is a cross sectional detail view indicating the method of securing the bracket 30 to the post of the side frame.

1 and 2 are side frames or fences between which is arranged a normally elevated inclined platform 3 hinged at 4, the upper free end of the said platform extending over a well 5 and being connected by a rod 6 to the piston rod 7 of a pump 8 situated within the well. This pump may be provided with suitable positioning devices such as a spoke 9 adapted to be driven into the bottom of the well, and extensible arms 10 adapted to be brought in engagement with the side walls of the well.

The pump is also provided with a double check valve device comprising an inlet ball valve 11 and an outlet ball valve 12 resting upon seats 13 and 14 respectively, 15 being a strainer to prevent the admission of an undue amount of foreign matter to the pump.

16 is the discharge pipe extending upwardly from the pump and above the top of the well, the upper outlet end 17 of which is bent downwardly to discharge into a trough or tank 18 situated at the mouth of the well and extending somewhat thereover, so that upon the depression of the platform 3 by an animal stepping thereon a quantity of water will be forced by the pump up the discharge pipe 16 and into the said tank 18 for the benefit of such animal or animals.

Ordinarily in mild weather such water may be permitted to remain in the tank until consumed, an overflow pipe 19 being provided which opens through the valve 33 into which it is detachably threaded into an outlet pipe 20 to permit of the return of excess water from the tank to the well thereby eliminating waste; and 21 is a filter for such water as may be returned to the well, for the purpose of preventing contamination of the water in the well by the water returned thereto.

The maintaining of the platform raised is effected by means of weights 22 attached to cords 23 which pass over pulleys 24 and are attached at the said platform at 25.

To prevent the constant pumping of water once the tank is full and the unnecessary operation of the platform under such conditions, I provide a float 26 in the form of a board having a central opening 27 therein to give access to the water in the tank, this float being connected by bell crank levers 28 to reciprocating rods 29 carried by brackets 30 on the side frames 1 and 2 of the structure, the said rods 29 terminating in upwardly swingable trip arms 31, which trip arms will be projected into the path of the platform 3 and thereby prevent its depression when the float is raised due to the tank being full of water. When the tank is not full, however, the operation of the bell crank levers by the falling of the float will retract the trip arms and permit the free operation of the platform for the purpose of effecting the refilling of the tank when animals step upon the said platform, and the upward swinging nature of the said trip arms will permit the said platform to freely pass to a position and above them should the tank become filled before the said platform has assumed its raised position.

The operation of the device ensures an adequate supply of water being continuously maintained in the tank during mild weather as is desirable, but in cold weather, particularly when there is danger of water freezing in the tank, the maintaining of such supply would not be feasible, and under such conditions it is required that the tank be empty when not actually being used for drinking purposes, for which reason I provide for the modification of the operation of the device by the rendering of certain parts thereof inoperable as will now be explained.

The desired result is obtained by eliminating or rendering inoperable the means, in this case the float and mechanism coupled thereto, which is provided for maintaining of a predetermined level of water in the tank and also the removal of the overflow pipe 19, where such is provided, from the valve 33 in order that complete emptying of the tank may be secured, and in removing the said float bolts 32 which secure the brackets 30 to the side frames may be removed therefrom, thereby also permitting the removal of the bell crank lever and reciprocating rod with its trip arm, so that no opposition will be offered at any time after such removal to the actuation of the platform 3. Thus every time the platform is depressed by an animal stepping thereon, a supply of water will be admitted to the tank, this supply being retained in the tank during the depression of the platform and during the incidental presence of the animal at the tank, by reason of the closing off of a valve 33 situated in the outlet pipe 20 and actuated by a weighted lever 34 connected to the spindle 35 of the said valve and provided at its free end with a link 36, the upper end of which engages the platform and ensures closing and opening of the said valve as the platform is depressed and raised respectively. It follows that when an animal steps from the platform after drinking from the tank, the platform rises and opens the outlet valve 33, thereby permitting the water which remains in the tank, to return to the well through the medium of the filter 21. In this way the possibility of a considerable body of water remaining in the tank long enough to become frozen in winter time is obviated.

It is also desirable that the body of the water in the tank shall be restricted in winter, as opposed at the maintaining of a considerable body of water therein in the warmer weather, for which reason partitions 37 dividing the tank into compartments are provided, each having a communicating passage 38 therein and near the bottom thereof, which may in winter time be closed by plugs 39 in order that the full capacity of the tank may be utilized in summer and the central compartment only utilized in the winter.

The outlet valve need not necessarily be disconnected in summer time as the presence of the overflow pipe 19 will prevent the complete emptying of the tank at such times irrespective of the operation of the valve which may, however, be disconnected if desired by the disengaging of the link 36 from the platform during mild seasons.

By the use of an arrangement such as that described, water is supplied to the tank in a manner consistent with the season and temperature, so that the freezing up of the tank in winter in the manner which would ordinarily occur in colder latitudes is not liable to occur and consequently adequate and automatic watering of stock is provided for throughout all seasons without requiring extensive changes or precautions being adopted to ensure such supply as would ordinarily be required were such provisions as that suggested not made.

It will be understood that although the device is described as being applied to a well for which it is more particularly intended it is applicable also to any suitable body of water such for example as may be contained in a cistern.

This invention may be developed within the scope of the following claims without departing from the essential features of the said invention, and it is desired that the specification and drawing be read as merely illustrative and not in a limiting sense, except as necessitated by the prior art.

What I claim is:—

1. In a device of the class described, in combination a depressible platform, a tank, water pumping apparatus operable by the depression of said platform to supply water to said tank, a float in said tank, and platform locking means rendered active by said float when raised.

2. A device according to claim 1, wherein the locking means comprise members movable by said float when raised into the path of the platform to prevent depression thereof.

3. A stock watering device for use in all seasons comprising in combination a depressible platform, a tank, a pump operable by said platform, and removable means determining the level of water in said tank whereby a body of water is maintained therein in mild weather and upon removal of said means said tank is permitted to empty after each discharge of water thereinto in cold weather.

4. A stock watering device comprising in combination a depressible platform, a tank, a water pump operable by said platform, a removable float in said tank, and platform locking means actuated by said float when raised by a body of water in said tank.

5. A device according to claim 4 wherein an outlet valve is provided for said tank, said outlet valve being closed and opened respectively by the depression and raising of said platform.

6. A device according to claim 4 wherein the tank is partitioned to provide compartments, one of which directly receives water from said pump and the others of which normally communicate by passages with said receiving compartment, and removable closures for said passages.

7. In a stock watering device applicable to a well, comprising a depressible platform; a tank, and a pump for the filling of said tank operable by said platform, said pump being provided with adjustably extendable arms adapted to engage the walls of a well into which the pump is sunk for the positioning of said pump.

8. In a device of the class described, in combination a well pump, a tank receiving water from said pump, a depressible platform operating said pump, and float operated means locking said platform against further operation when said tank is filled to a predetermined level.

In testimony whereof I affix my signature in presence of two witnesses.

HINRICH FLESSNER.

Witnesses:
S. LIGHTFOOT,
ANNA M. DORR.